United States Patent
Fang (10) Patent No.: US 12,292,497 B2
(45) Date of Patent: May 6, 2025

(54) GESTURE RECOGNITION METHOD AND APPARATUS, MOBILE TERMINAL, AND COMPUTER READABLE STORAGE MEDIUM

(71) Applicant: Beijing Xiaomi Mobile Software Co., Ltd., Beijing (CN)

(72) Inventor: Wendou Fang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 498 days.

(21) Appl. No.: 17/585,908

(22) Filed: Jan. 27, 2022

(65) Prior Publication Data

US 2022/0381897 A1    Dec. 1, 2022

(30) Foreign Application Priority Data

May 28, 2021    (CN) ........................ 202110592996.X (51) Int. Cl.
| | |
|---|---|
| *G01S 13/56* | (2006.01) |
| *G01S 13/02* | (2006.01) |
| *G06F 3/01* | (2006.01) |
| *H01Q 3/24* | (2006.01) |
| *H04B 7/04* | (2017.01) |

(52) U.S. Cl.
CPC .......... *G01S 13/56* (2013.01); *G01S 13/0209* (2013.01); *G06F 3/011* (2013.01); *H01Q 3/24* (2013.01); *H04B 7/04* (2013.01)

(58) Field of Classification Search
CPC ...... G01S 13/56; G01S 13/0209; G06F 3/011; H01Q 3/24; H04B 7/04
See application file for complete search history.

(56) References Cited

U.S. PATENT DOCUMENTS

| | | |
|---|---|---|
| 8,000,406 B2 | 8/2011 | Stoica et al. |
| 10,310,621 B1 | 6/2019 | Lien et al. |
| 2013/0028148 A1 | 1/2013 | Heo et al. |

(Continued)

FOREIGN PATENT DOCUMENTS

| | | |
|---|---|---|
| CN | 106055089 A | 10/2016 |
| CN | 108051775 A | 5/2018 |

(Continued)

OTHER PUBLICATIONS

Chinese Office Action issued on Sep. 27, 2023 for Chinese Patent Application No. 202110592996.X.

(Continued)

*Primary Examiner* — Bernarr E Gregory
*Assistant Examiner* — Hailey R Le
(74) *Attorney, Agent, or Firm* — Volpe Koenig (57) ABSTRACT

A mobile terminal includes: a UWB chip, configured to output UWB pulse signals of a first preset quantity in a signal cycle and further configured to generate a frame of detection data on the basis of echo signals of signal cycles of a second preset quantity; a switchover module, configured to control an antenna module to be switched to a target antenna, in which the target antenna includes a first target antenna configured to radiate the UWB pulse signals into space and a second target antenna configured to receive echo signals; and a processor, configured to recognize a gesture on the basis of at least one frame of detection data.

17 Claims, 4 Drawing Sheets

(56) References Cited

U.S. PATENT DOCUMENTS

| | | | |
|---|---|---|---|
| 2015/0200706 A1* | 7/2015 | Bottazzi | G01S 7/40 |
| | | | 375/140 |
| 2016/0011668 A1 | 1/2016 | Gilad-Bachrach et al. | |
| 2016/0070341 A1* | 3/2016 | Zhang | G06F 3/017 |
| | | | 345/156 |
| 2018/0088221 A1* | 3/2018 | Yomo | G01S 7/003 |
| 2019/0342751 A1* | 11/2019 | Li | H04L 63/061 |
| 2019/0383927 A1 | 12/2019 | Mihajlovic et al. | |
| 2021/0076350 A1* | 3/2021 | Yang | G01S 3/50 |
| 2022/0260647 A1* | 8/2022 | Baumgartner | G01N 29/11 |
| 2022/0302933 A1* | 9/2022 | Nam | H04B 1/00 |
| 2023/0283327 A1* | 9/2023 | Forenza | H04B 7/0456 |
| | | | 375/267 |

FOREIGN PATENT DOCUMENTS

| | | | |
|---|---|---|---|
| CN | 110225194 A | | 9/2019 |
| CN | 111414843 A | | 7/2020 |
| CN | 112202462 A | | 1/2021 |
| CN | 112383335 A | | 2/2021 |
| CN | 112468177 A | | 3/2021 |

OTHER PUBLICATIONS

Extended European Search Report dated Jul. 21, 2022 for European Patent Application No. 22153687.3.

Zhang, C., et al., "Analysis of effect of transmit antenna scanning modulation on non-cooperative bistatic radar", 1 Journal of Systems Engineering and Electronics, (2011).

\* cited by examiner

GESTURE RECOGNITION METHOD AND APPARATUS, MOBILE TERMINAL, AND COMPUTER READABLE STORAGE MEDIUM

CROSS REFERENCE TO RELATED APPLICATIONS

The present application is provided based on and claims priority to the Chinese Patent Application No. 202110592996.X, filed on May 28, 2021, the entire contents of which are incorporated herein by reference.

BACKGROUND

With wide application of mobile terminals such as smart phones, they include more and more functions, such as gesture recognition. Accordingly, the mobile terminal can realize effects of taking a picture or unlocking, etc. through a gesture recognition function. In the related art, there may be three gesture recognition modes: gesture recognition based on a wearable device, gesture recognition based on computer vision and a gesture recognition mode based on a radar.

SUMMARY

The present disclosure provides a gesture recognition method and apparatus, a mobile terminal and a computer readable storage medium so as to overcome defects in the related art.

According to a first aspect of an example of the present disclosure, a mobile terminal is provided, including an Ultra Wide Band (UWB) chip, an antenna module, a switchover module and a processor. The UWB chip is connected with the switchover module and the processor respectively, the switchover module is connected with the antenna module, and the antenna module includes a plurality of antennas.

The UWB chip is configured to output UWB pulse signals of a first preset quantity in a signal cycle.

The switchover module is configured to control the antenna module to be switched to a target antenna, the target antenna includes a first target antenna configured to radiate the UWB pulse signals into space and/or a second target antenna configured to receive echo signals, and the echo signals refer to signals returned after the UWB pulse signals meet a target object in the space.

The UWB chip is further configured to generate a frame of detection data on the basis of the echo signals of signal cycles of a second preset quantity.

The processor is configured to recognize a gesture of the target object on the basis of at least one frame of detection data.

According to a second aspect of an example of the present disclosure, a gesture recognition method is provided, applied to a mobile terminal and including:

outputting UWB pulse signals of a first preset quantity in a signal cycle;

controlling an antenna module to be switched to a target antenna, in which the target antenna includes a first target antenna configured to radiate the UWB pulse signals into space and/or a second target antenna configured to receive echo signals, and the echo signals refer to signals returned after the UWB pulse signals meet a target object in the space;

generating a frame of detection data on the basis of the echo signals of signal cycles of a second preset quantity; and recognizing a gesture of the target object on the basis of at least one frame of detection data.

According to a third aspect of an example of the present disclosure, a mobile terminal is provided, including:

a processor; and a memory, configured to store a computer program executable by the processor.

The processor is configured to execute the computer program in the memory so as to realize:

outputting UWB pulse signals of a first preset quantity in a signal cycle;

controlling an antenna module to be switched to a target antenna, in which the target antenna includes a first target antenna configured to radiate the UWB pulse signals into space and/or a second target antenna configured to receive echo signals, and the echo signals refer to signals returned after the UWB pulse signals meet a target object in the space;

generating a frame of detection data on the basis of the echo signals of signal cycles of a second preset quantity; and recognizing a gesture of the target object on the basis of at least one frame of detection data.

According to a fourth aspect of an example of the present disclosure, a non-transitory computer readable storage medium is provided. When an executable computer program in the storage medium is executed by a processor, any method described above can be realized.

It should be understood that the above general description and the following detailed description are only exemplary and explanatory rather than limit the present disclosure.

BRIEF DESCRIPTION OF THE DRAWINGS

Accompanying drawings here, which are incorporated in and constitute a part of this specification, illustrate examples consistent with the present disclosure and, together with the specification, serve to explain principles of the present disclosure.

DETAILED DESCRIPTION

Examples will be described in detail here, whose instances are represented in the drawings. Unless otherwise stated, the same reference numbers in the different drawings represent the same or similar elements when the following description concerns the drawings. The examples described below do not represent all examples consistent with the present disclosure. Rather, they are only examples of an apparatus detailed in the appended claims and consistent with some aspects of the present disclosure.

Gesture recognition based on a wearable device refers to obtaining gesture information by using a sensor. However, the wearable device needs to be worn in a contact mode and cannot be integrated into the mobile terminal, being inconvenient to use. Gesture recognition based on computer vision refers to recognition realized by collecting an image through an optical camera, but it needs to occupy a large quantity of computing resources and is susceptible to light rays. Gesture information based on radar refers to obtaining point cloud data through a frequency modulation continuous wave (FMCW) radar to realize gesture recognition, but radar is bulky and difficult to integrate into the mobile terminal and needs continuously-transmitted frequency modulation continuous waves, leading to quite high power consumption and retarding integration into the mobile terminal.

During implementation of the present solution, the inventor discovered: an Ultra Wide Band (UWB) chip is arranged originally in an existing mobile terminal, the UWB chip sends a microwave signal in a specific direction, and then short-distance communication or positioning between two devices is realized through the microwave signal. However, considering that gesture recognition needs a high resolution and a large antenna aperture, which is contradictory with a narrow space and few computing resources of the mobile terminal, the UWB chip cannot be applied to gesture recognition. The antenna aperture refers to a region around an antenna, also called a capture region and configured to capture an echo signal of an antenna signal. If other conditions are the same, the larger an area of the antenna aperture is, the higher the capacity of capturing an echo signal will be.

Figure 1:
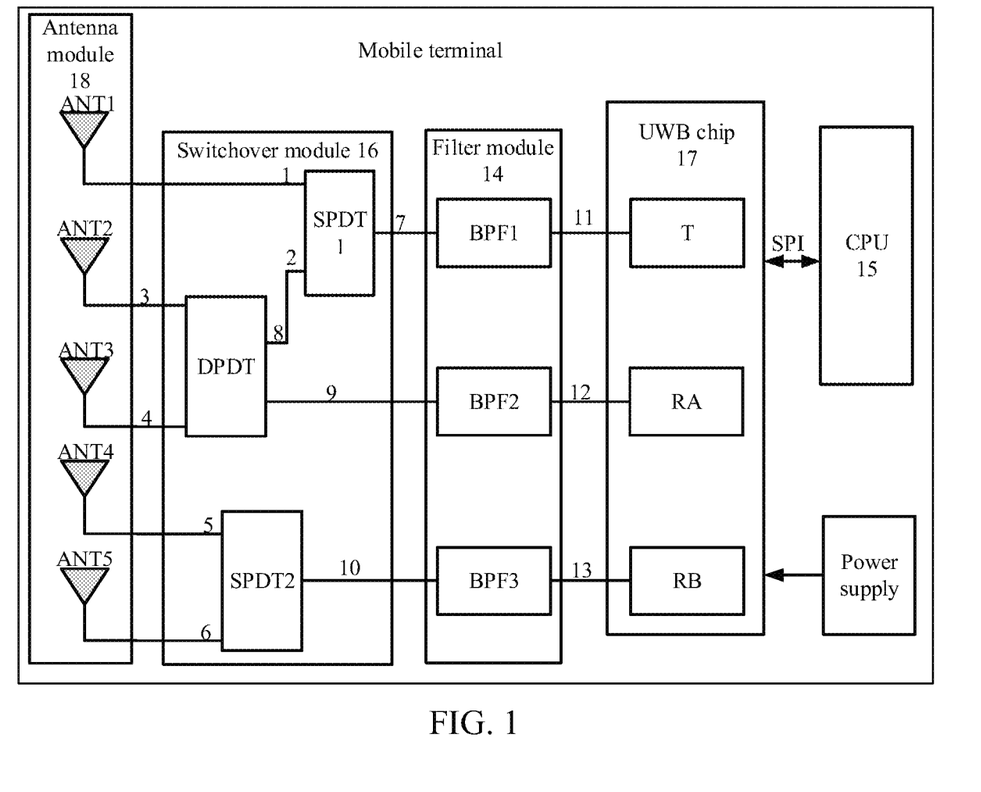
FIG. 1 is a block diagram of a mobile terminal illustrated according to an example.

In order to solve the above technical problem, an example of the present disclosure provides a mobile terminal such as a smart phone, a tablet computer and other devices. FIG. 1 is a block diagram of a mobile terminal illustrated according to an example. It needs to be stated that in order to simplify the drawings, only components related to the present example are shown in FIG. 1. Referring to FIG. 1, the mobile terminal includes a processor 15, a UWB chip 17, an antenna module 18 and a switchover module 16. The UWB chip 17 is connected with the switchover module 16 and the processor 15 respectively. The switchover module 16 is connected with the antenna module 18. The antenna module includes a plurality of antennas.

The UWB chip 17 is configured to output UWB pulse signals of a first preset quantity in a signal cycle.

The switchover module 16 is configured to control the antenna module 18 to be switched to a target antenna. The target antenna includes a first target antenna configured to radiate the UWB pulse signals into space and/or a second target antenna configured to receive echo signals. The echo signals refer to signals returned after the UWB pulse signals meet a target object in the space.

The UWB chip 17 is further configured to generate a frame of detection data on the basis of the echo signals of signal cycles of a second preset quantity.

The processor 15 is configured to recognize a target gesture on the basis of at least one frame of detection data.

Accordingly, in the solution provided by the example of the present disclosure, the UWB pulse signals can be radiated into the space through the first target antenna, as the first target antenna can transmit the pulse signals in different positions, equivalently, the same antenna moves to different radiating positions, and also equivalently, a receiving position of the second target antenna moves, a region area of receiving the echo signals can be increased, that is, an antenna aperture of the mobile terminal can be increased, and use experience of the mobile terminal is advantageously improved.

In an example, it is considered that space resources of the mobile terminal are limited, and antennas in the configured antenna module are limited. In an instance, there is a time division multiplexing antenna in the target antenna to which the antenna module is switched, that is, the time division multiplexing antenna serves as the first target antenna at a moment in the signal cycle to transmit the UWB pulse signals and serves as the second target antenna at another moment in the signal cycle to receive the echo signals. In this way, in the present example, through the time division multiplexing antenna, the quantity of antennas in the antenna module can be reduced, and an occupied space of the mobile terminal can be reduced.

Figure 2:
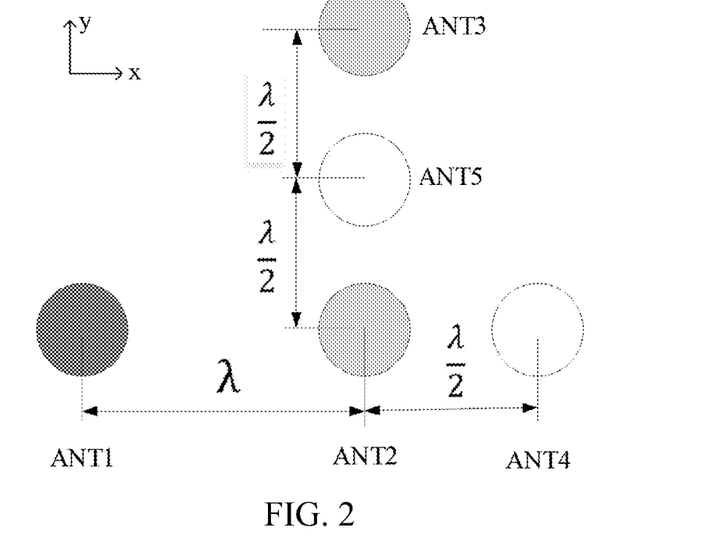
FIG. 2 is a schematic diagram of antenna layout illustrated according to an example.

In an example, the antenna module may include a first antenna, a second antenna, a third antenna, a fourth antenna and a fifth antenna, namely, an antenna ANT1, an antenna ANT2, an antenna ANT3, an antenna ANT4 and an antenna ANT5 in sequence shown in FIG. 1. Referring to FIG. 2, the first antenna, the second antenna and the fourth antenna are sequentially arranged in a first direction, such as an x axis direction shown in FIG. 2, the second antenna, the fifth antenna and third antenna are arranged in a second direction in sequence, such as a y axis direction shown in FIG. 2, and the first direction is perpendicular to the second direction. A distance between the first antenna and the second antenna is a wavelength $\lambda$, a distance between the second antenna and the fourth antenna is half of the wavelength, a distance between the second antenna and the fifth antenna is half of the wavelength, and a distance between the third antenna and the fifth antenna is half of the wavelength.

It can be understood that the above wavelength is a wavelength of a signal radiated by the antenna module. A frequency band of the antenna module is 6.5 GHz to 8.5 GHz, the above wavelength is about 4.62 cm when a center frequency is 6.5 GHz, and the above wavelength is about 3.75 cm when the center frequency is 8 GHz. Those of skill can determine the wavelength, namely a distance between the two adjacent antennas, according to the center frequency, and a corresponding solution falls within the protection scope of the present disclosure.

It needs to be stated that the first direction and the second direction are set on the basis of a plane where the five antennas in the antenna module are located and the intent is to indicate setting positions of the five antennas. A corresponding relation between the first direction and all directions of the mobile terminal can change according to setting positions of the antenna module. For example, when the plane where the antenna module is located is parallel to a display screen of the mobile terminal, the first direction may be parallel to a width direction of the mobile terminal, and the second direction may be parallel to a height direction of the mobile terminal, which can be interchangeable. For another example, when the plane where the antenna module is located is parallel to a side bezel of the mobile terminal, the first direction may be parallel to a width direction of the side bezel, and the second direction may be parallel to a height direction of the side bezel, which can be interchangeable. Those of skill can make an adjustment according to a specific scene, and a corresponding solution falls within the protection scope of the present disclosure.

It needs to be stated, the antenna module shown in FIG. 2 includes only five antennas, with change of the quantity of antennas in the antenna module, position arrangement of these antennas may be adaptively adjusted, the subsequent time division multiplexing antenna will also adaptively change, even so, an inventive concept provided by the example shown in FIG. 2 is still suitable for this, and an obtained solution still falls within the protection scope of the present disclosure.

Taking a common UWB chip at present for example, it includes a transmitting port and two receiving ports, which can only realize one transmission and two receptions and whose resolution cannot meet a demand of gesture recognition. In order to guarantee normal work of the five antennas, in the present example, time division multiplexing is performed on some of the five antennas. Continuing to refer to FIG. 1, the switchover module 16 includes a first switchover switch SPDT1, a second switchover switch DPDT and a third switchover switch SPDT2. Control ends of the first switchover switch, the second switchover switch and the third switchover switch are configured to receive a first switchover control signal and a second switchover control signal. A first end 7 of the first switchover switch is connected with the UWB chip 17, a second end 1 of the first switchover switch is connected with the first antenna, and a third end 2 of the first switchover switch is connected with a first end 8 of the second switchover switch. A second end 9 of the second switchover switch is connected with the UWB chip 17, a third end 3 of the second switchover switch is connected with the second antenna, and a fourth end 4 of the second switchover switch is connected with the third antenna. A first end 10 of the third switchover switch is connected with the UWB chip 17, a second end 5 of the third switchover switch is connected with the fourth antenna, and a third end 6 of the third switchover switch is connected with the fifth antenna.

In the present example, each of the switchover switches includes at least one of: a double-throw switch, a relay or a transistor. In an instance, taking each of the above switchover switches being a double-throw switch for example, continuing to refer to FIG. 1, the first switchover switch is a single-pole double-throw switch, such as a switchover switch SPDT1, the second switchover switch is a double-pole double-throw switch, such as a switchover switch DPDT, and the third switchover switch is a single-pole double-throw switch, such as a switchover switch SPDT2. Those of skill can select a related device according to a specific scene to realize each of the switchover switches, and a corresponding solution falls within the protection scope of the present disclosure. For the sake of convenient description, each subsequent example is described by taking the double-throw switch for example.

It can be known from the above connection relation that the first switchover switch can control work of the first antenna, and the first antenna is used as only a transmitting antenna of transmitting the UWB pulse signals. the first switchover switch and the second switchover switch can jointly control work of the second antenna and the third antenna, which realizes the purpose of time division multiplexing of the second antenna and the third antenna and can make them serve as not only transmitting antennas of transmitting the UWB pulse signals, but also receiving antennas of receiving the echo signals. The third switchover switch can control work of the fourth antenna and the fifth antenna, and the fourth antenna and the fifth antenna serve as transmitting antennas of transmitting the UWB pulse signals.

Figure 3:
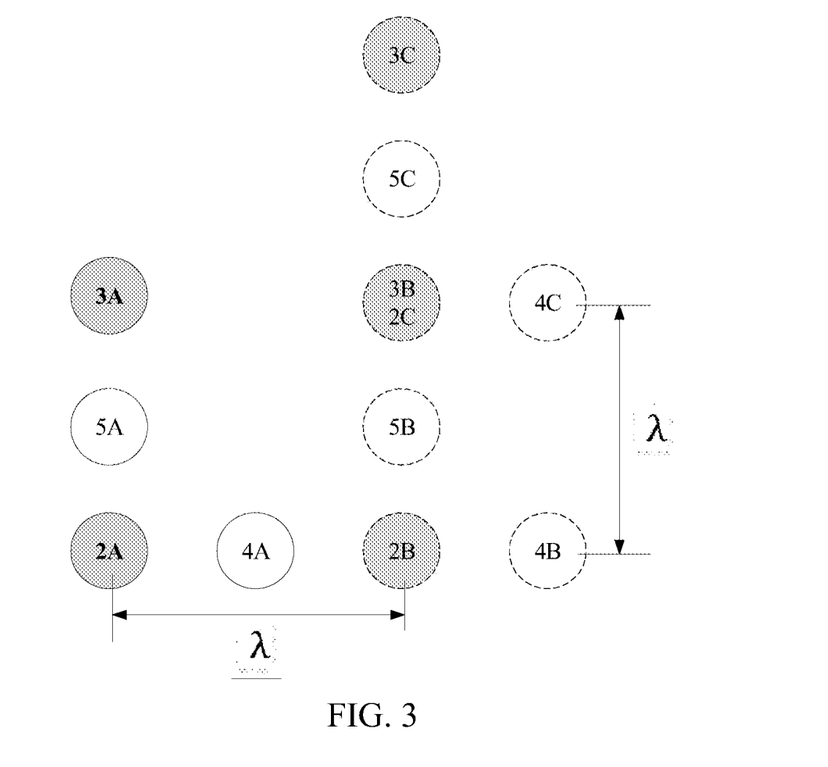
FIG. 3 is a schematic diagram of receiving antenna layout illustrated according to an example.

On the basis of the above connection relation and a position relation of the antennas, continuing to refer to FIG. 2, when the first antenna, the second antenna and the third antenna serve as the transmitting antennas respectively, there are three transmitting positions of the transmitting antennas changing, equivalently, the same antenna transmits the UWB pulse signals thrice in the different positions, and density of transmitting the UWB pulse signals can be improved. Correspondingly, when one of the first antenna, the second antenna or the third antenna serves as the transmitting antenna, the other four antennas can serve as the receiving antennas, and position arrangement of the receiving antennas may be shown in FIG. 3, including:

when the first antenna serves as the transmitting antenna, the second antenna, the third antenna, the fourth antenna and the fifth antenna serve as the receiving antennas, receiving positions of the second antenna, the third antenna, the fourth antenna and the fifth antenna are 2A, 3A, 4A and 5A in sequence.

When the second antenna serves as the transmitting antenna, switchover time of the switchover module is sufficiently short and the UWB pulse signals transmitted by the first antenna are sufficiently short, the second antenna moves by a distance of a wavelength towards the first direction compared with the first antenna, when the second antenna, the third antenna, the fourth antenna and the fifth antenna serve as the receiving antennas, the receiving positions of the second antenna, the third antenna, the fourth antenna and the fifth antenna are 2B, 3B, 4B and 5B in sequence, and at the moment, the time division multiplexing is performed on the second antenna.

When the third antenna serves as the transmitting antenna, the switchover time of the switchover module is sufficiently short and the UWB pulse signals transmitted by the second antenna are sufficiently short, the third antenna moves by a distance of a wavelength towards the second direction compared with the second antenna, when the second antenna, the third antenna, the fourth antenna and the fifth antenna serve as the receiving antennas, the receiving positions of the second antenna, the third antenna, the fourth antenna and the fifth antenna are 2C, 3C, 4C and 5C in sequence, and at the moment, time division multiplexing is performed on the third antenna.

It needs to be stated that FIG. 3 includes full line circles and dotted line circles, the full line circles represent actual positions of the antennas, and the dotted line circles represent virtual receiving antennas expanded after the transmitting positions of the transmitting antennas change. In this way, a region covered with corresponding receiving antennas (the full line circles and the dotted line circles) of a total of three transmitting antennas, namely, the first antenna, the second antenna and the third antenna or a region of capturing the echo signals by the antenna module is obviously larger than an original region, that is, the antenna aperture in example of the present disclosure becomes obviously larger.

It needs to be further noted that the distance between the second antenna and the third antenna in the second direction is a wavelength, so the receiving antenna (namely, the third antenna) when the second antenna serves as the transmitting antenna and the receiving antenna (namely, the second antenna) when the third antenna serves as the transmitting antenna are in the same position, for example, the positions of 2C and 3B in FIG. 3 coincide, equivalently, the second antenna moves up by the distance of a wavelength so as to receive the echo signals. In this way, in the present example, the two echo signals in the coinciding position can be compared, position offset of the target object is compensated, and an error caused by movement of the target object in the signal cycle is reduced.

In an example, the mobile terminal further includes a filter module 14. The filter module is connected with the UWB chip and the switchover module respectively. Continuing to refer to FIG. 1, the above filter module may include a band-pass filter BPF1, a band-pass filter BPF2 and a band-pass filter BPF3. A first end 11 of the band-pass filter BPF1 is connected with a transmitting end (corresponding to a transmitter T) of the UWB chip, and a second end 7 of the band-pass filter BPF1 is connected with the first end of the first switchover switch. A first end 12 of the band-pass filter BPF2 is connected with a receiving end (corresponding to a receiver RA) of the UWB chip 17, and a second end of the band-pass filter BPF2 is connected with the second end 9 of the second switchover switch. A first end 13 of the band-pass filter BPF3 is connected with a receiving end (corresponding to a receiver RB) of the UWB chip 17, and a second end of the band-pass filter BPF3 is connected with the first end 10 of the third switchover switch. In the present example, by arranging the filter module, noise signals in the UWB pulse signals and the echo signals can be filtered 1 out, and a signal-to-noise ratio is increased.

In an example, the antenna module 18 may include a plurality of antennas under the condition that there are enough space resources of the mobile terminal or sizes of the antennas are enough small. The plurality of antennas includes the first target antenna and the second target antenna. The first target antenna is only configured to radiate the UWB pulse signals into the space, and the second target antenna is only configured to receive the echo signals. Or, under the condition that there are enough antennas in the antenna module, the plurality of antennas may include the transmitting antennas radiating the UWB pulse signals and the receiving antennas receiving UWB pulse signals, that is, functions of the transmitting antennas and the receiving antennas are fixed, so the transmitting antennas can be switched according to a time sequence of the UWB pulse signals or a set sequence or randomly when the pulse signals are transmitted, and meanwhile the receiving antennas can be switched to which the transmitting antennas correspond so as to receive the echo signals.

Taking the first preset quantity being 3 for example, there are 3 first target antennas distributed in different positions, and there may be four second target antennas distributed in different positions. In this way, after each of the first target antennas transmits the UWB pulse signals, the four second target antennas can receive the echo signals, and detection data formed by 3*4=12 echo signals can be obtained. In other words, more detection data can be obtained in the signal cycle so that gesture recognition can be realized. Those of skill can set the quantity of the antennas according to a specific scene, for example, the space resources of the mobile terminal or the sizes of the antennas so that an effect of obtaining the detection data needed for meeting gesture recognition can be achieved, and a corresponding solution falls within the protection scope of the present disclosure.

A process of gesture recognition under the condition that time division multiplexing is performed on some of the antennas in the antenna module is described below with reference to the mobile terminal of the example shown in FIG. 1 to FIG. 3, and in each of the signal cycles, the transmitting antennas ANT1 to ANT3 transmits the UWB pulse signals at least once, that is, in one signal cycle, the antenna module outputs UWB pulse signals of a first preset quantity. With reference to a switchover process of the switchover switches, in the instance, a value of the first preset quantity is 6, or may be 9 or 12, etc., during actual application, that is, the first preset quantity is related to the quantity of the transmitting antennas, namely may be a multiple of 3. The receiving antenna ANT2 to ANT5 receive the echo signals of the UWB pulse signals transmitted by each of the transmitting antennas respectively.

Under the condition of omitting time occupied by switching of the switchover switches, the above signal cycle is in positive correlation to time spent on generating the frame of detection data by the UWB chip, that is, the higher the processing capacity of the UWB chip is, the shorter the time spent on generating the frame of detection data is and the shorter the signal cycle may be. Those of skill can select a proper signal cycle according to a specific scene, and a corresponding solution falls within the protection scope of the present disclosure.

With increase of times of receiving the echo signal in each of the signal cycles, an obtained gesture is more accurate, but it needs more processing resources, and those of skill can select the proper quantity of times according to a specific scene. In each of the signal cycles, taking the receiving antennas receiving the echo signals of each of the transmitting antennas once for example, an exemplary process includes:

In a stage 1, a switchover switch SPDT1 switches to the antenna ANT 1, and the first antenna serves as the transmitting antenna to transmit the UWB pulse signal 1. The UWB chip generates the UWB pulse signal 1, and the UWB pulse signal 1 passes through the band-pass filter BPF1 to reach the switchover switch SPDT1. The switchover switch SPDT1 switches to the antenna ANT1, the UWB pulse signal 1 is radiated into the space through the antenna ANT1, that is, a signal path is 11→7→1→ANT1.

In this stage, the antenna ANT2 and the antenna ANT4 serve as the receiving antennas, that is, the antenna ANT2 and the antenna ANT4 form a target antenna group. The echo signal received by the antenna ANT2 passes through the switchover switch DPDT to reach the band-pass filter BPF2, is filtered through the band-pass filter BPF2 and then enters the UWB chip, and at that moment, the signal path is ANT2→3→9→12. The echo signal on the antenna ANT4 passes through the switchover switch SPDT2 to reach the band-pass filter BPF3, is filtered through the band-pass filter BPF3 and then enters the UWB chip, and at that moment, the signal path is ANT4→5→10→13.

In a stage 2, the switchover switch SPDT1 switches to the antenna ANT1, and the first antenna serves as the transmitting antenna to transmit the UWB pulse signal 2. The UWB chip generates the UWB pulse signal 2, and the UWB pulse signal 2 passes through the band-pass filter BPF1 to reach the switchover switch SPDT1. The switchover switch SPDT1 switches to the antenna ANT1, and the UWB pulse signal 1 is radiated into the space through the Antenna ANT1, that is, the signal path is 11→7→1→ANT1.

In this stage, the antenna ANT3 and the antenna ANT5 serve as the receiving antennas, that is, the switchover switch DPDT switches to the antenna ANT3 and the switchover switch SPDT2 switches to the antenna ANT5, and the antenna ANT3 and the antenna ANT5 form a target antenna group. The echo signal received by the antenna ANT3 passes through the switchover switch DPDT to reach the band-pass filter BPF2, is filtered through the band-pass filter BPF2 and then enters the UWB chip, and at that moment, the signal path is ANT3→4→9→12. The echo signal on the antenna ANT5 passes through the switchover switch SPDT2 to reach the band-pass filter BPF3, is filtered through the band-pass filter BPF3 and then enters the UWB chip, and at the moment, the signal path is ANT5→6→10→13.

In a stage 3, the switchover switch SPDT1 and the switchover switch DPDT switch to the antenna ANT2, that is, the second antenna serves as the transmitting antenna to transmit the UWB pulse signal 3. The UWB chip generates the UWB pulse signal 3, and the UWB pulse signal 3 passes through the band-pass filter BPF1 to reach the switchover switch SPDT1 and the switchover switch DPDT. The UWB pulse signal 3 is radiated into the space through the antenna ANT2, that is, the signal path is 11→7→2→8→3→ANT2.

In this stage, the antenna ANT2 and the antenna ANT4 serves as the receiving antennas, that is, the antenna ANT2 and the antenna ANT4 form the target antenna group. The echo signal received by the antenna ANT2 passes through the switchover switch DPDT to reach the band-pass filter BPF2, is filtered through the band-pass filter BPF2 and then enters the UWB chip, and at that moment, the signal path is ANT2→3→9→12. The echo signal on the antenna ANT4 passes through the switchover switch SPDT2 to reach the band-pass filter BPF3, is filtered through the band-pass filter BPF3 and then enters the UWB chip, and at the moment, the signal path is ANT4→5→10→13.

In a stage 4, the switchover switch SPDT1 and the switchover switch DPDT switch to the antenna ANT2, that is, the second antenna serves as the transmitting antenna to transmit the UWB pulse signal 4. The UWB chip generated the UWB pulse signal 4, and the UWB pulse signal 4 passes through the band-pass filter BPF1 to reach the switchover switch SPDT1 and the switchover switch DPDT. The UWB pulse signal 3 is radiated into the space through the antenna ANT2, that is, the signal path is 11→7→2→ANT2.

In this stage, the antenna ANT3 and the antenna ANT5 serve as the receiving antennas, that is, the switchover switch DPDT switches to the antenna ANT3 and the switchover switch SPDT2 switches to the antenna ANT5, and the antenna ANT3 and the antenna ANT5 form the target antenna group. The echo signal received by the antenna ANT3 passes through the switchover switch DPDT to reach the band-pass filter BPF2, is filtered through the band-pass filter BPF2 and then enters the UWB chip, and at that moment, the signal path is ANT3→4→9→12. The echo signal on the antenna ANT5 passes through the switchover switch SPDT2 to reach the band-pass filter BPF3, is filtered through the band-pass filter BPF3 and the enters the UWB chip, and at the moment, the signal path is ANT5→6→10→13.

In a stage 5, the switchover switch SPDT1 and the switchover switch DPDT switch to the antenna ANT3, that is, the third antenna serves as the transmitting antenna to transmit the UWB pulse signal 5. The UWB chip generates the UWB pulse signal 5, and the UWB pulse signal 5 passes through the band-pass filter BPF1 to reach the switchover switch SPDT1 and the switchover switch DPDT. The UWB pulse signal 5 is radiated into the space through the antenna ANT3, that is, the signal path is 11→7→2→8→4→ANT3.

In this stage, the antenna ANT2 and the antenna ANT4 serve as the receiving antennas, that is, the antenna ANT2 and the antenna ANT4 form the target antenna group. The echo signal received by the antenna ANT2 passes through the switchover switch DPDT to reach the band-pass filter BPF2, is filtered through the band-pass filter BPF2 and then enters the UWB chip, and at the moment, the signal path is ANT2→3→9→12. The echo signal on the antenna ANT4 passes through the switchover switch SPDT2 to reach the band-pass filter BPF3, is filtered through the band-pass filter BPF3 and then enters the UWB chip, and at that moment, the signal path is ANT4→5→10→13.

In a stage 6, the switchover switch SPDT1 and the switchover switch DPDT switch to the antenna ANT3, that is, the third antenna serves as the transmitting antenna to transmit the UWB pulse signal 6. The UWB chip generated the UWB pulse signal 6, and the UWB pulse signal 6 passes through the band-pass filter BPF1 to reach the switchover switch SPDT1 and the switchover switch DPDT. The UWB pulse signal 6 is radiated into the space through the Antenna ANT3, that is, the signal path is 11→7→2→8→4→ANT3.

In this stage, the antenna ANT3 and the antenna ANT5 serve as the receiving antennas, that is, the switchover switch DPDT switches to the antenna ANT3 and the switchover switch SPDT2 switches to the antenna ANT5, that is, the antenna ANT3 and the antenna ANT5 form the target antenna group. The echo signal received by the antenna ANT3 passes through the switchover switch DPDT to reach the band-pass filter BPF2, is filtered through the band-pass filter BPF2 and then enters the UWB chip, and at that moment, the signal path is ANT3→4→9→12. The echo signal on the antenna ANT5 passes through the switchover switch SPDT2 to reach the band-pass filter BPF3, is filtered through the band-pass filter BPF3 and then enters the UWB chip, and at that moment, the signal path is ANT5→6→10→13.

In the present example, the echo signals in one signal cycle can be obtained from the above stage 1 to stage 6. Then, the frame of detection data is generated through the echo signals in the second preset quantity of signal cycles, that is, a gesture information matrix can be obtained. Then, the mobile terminal can input the above gesture information matrix into a preset gesture recognition model, the gesture recognition model can be realized by using a pre-trained neural network, such as a BP neural network, and gestures of the target object can be recognized through the gesture recognition model.

It needs to be noted that the larger a value of the second preset quantity is, the more accurate a gesture recognition result is, and in an instance, the value of the second preset quantity is 15. Those of skill can set the above second preset quantity according to the processing capacity of the gesture recognition model and time consumption of a gesture recognition function, and a corresponding solution falls within the protection scope of the present disclosure.

It needs to be noted that the above example introduces that the target antenna group may be ANT2 and ANT4, or ANT3 and ANT5, during actual application, the target antenna group may also be ANT2 and ANT5, or ANT3 and ANT4, those of skill can make a choice according to a specific scene, and a corresponding solution falls within the protection scope of the present disclosure.

It can be known from the above examples that in the solutions provided by the examples of the present disclosure, the UWB pulse signals can be radiated into the space respectively through the first target antenna; and as the first target antenna can radiate the UWB pulse signals in different positions, equivalently, the same antenna moves to different radiating positions, and also equivalently, a receiving position of the second target antenna moves, a region area of receiving the echo signals can be increased, that is, an antenna aperture of the mobile terminal can be increased, and use experience of the mobile terminal is advantageously improved.

Figure 4:
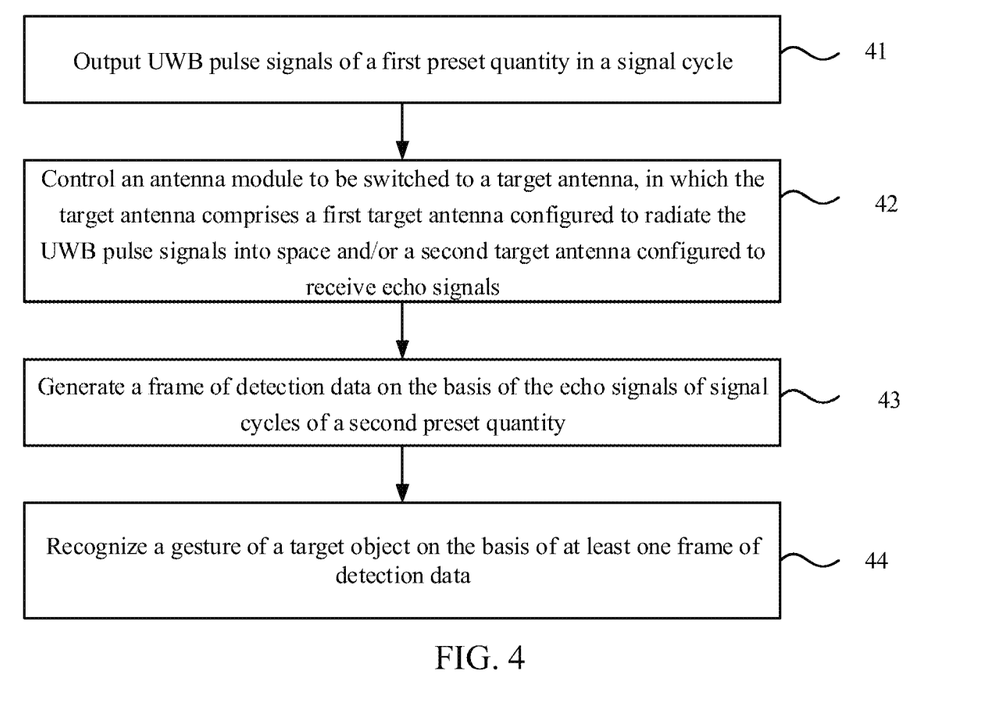
FIG. 4 is a flowchart of a gesture recognition method illustrated according to an example.

On the basis of the mobile terminal of the example shown in FIG. 1 to FIG. 3, an example of the present disclosure further includes a gesture recognition method, referring to FIG. 4, including step 41 to step 44.

In step 41, UWB pulse signals of a first preset quantity are output in a signal cycle.

In step 42, the antenna module is controlled to be switched to the target antenna. The target antenna includes a first target antenna configured to radiate the UWB pulse signals into a space and/or a second target antenna configured to receive echo signals, and the echo signals refer to signals returned after the UWB pulse signals meet a target object in the space.

In step 43, a frame of detection data on the basis of the echo signals of signal cycles of a second preset quantity is generated.

In step 44, a target gesture is recognized on the basis of at least one frame of detection data.

In the solutions provided by the examples of the present disclosure, the UWB pulse signals can be radiated into the space respectively through the first target antenna, as the first target antenna can radiate the UWB pulse signals in different positions, equivalently, the same antenna moves to different radiating positions, and also equivalently, a receiving position of the second target antenna moves, a region area of receiving the echo signals can be increased, that is, an antenna aperture of the mobile terminal can be increased, and use experience of the mobile terminal is advantageously improved.

In an example, optionally, the target antenna includes a time division multiplexing antenna.

Optionally, the controlling the antenna module to be switched to the target antenna includes:
  a first switchover signal is sent to the antenna module so as to switch the antenna module to the first target antenna, in which the first target antenna is configured to radiate the UWB pulse signals into the space; and
  a second switchover signal is sent to the antenna module so as to switch the antenna module to the second target antenna, in which the second target antenna is configured to receive the echo signals.

Optionally, the first target antenna is one of a first antenna, a second antenna or a third antenna, and moreover, the second target antenna is a group of the second antenna and a fourth antenna, or a group of the third antenna and a fifth antenna.

In an example, the first preset quantity is 6, and the controlling the antenna module to be switched to the target antenna includes:
  the antenna module is controlled to be switched to the first antenna, in which the first antenna is configured to radiate the first UWB pulse signal into the space;
  the antenna module is controlled to be switched to the second antenna and the fourth antenna, in which the second antenna and the fourth antenna are configured to receive the echo signals;
  the antenna module is controlled to be switched to the first antenna, in which the first antenna is configured to radiate the second UWB pulse signal into the space;
  the antenna module is controlled to be switched to the third antenna and the fifth antenna, in which the third antenna and the fifth antenna are configured to receive the echo signals;
  the antenna module is controlled to be switched to the second antenna, in which the second antenna is configured to radiate the third UWB pulse signal into the space;
  the antenna module is controlled to be switched to the second antenna and the fourth antenna, in which the second antenna and the fourth antenna are configured to receive the echo signals;
  the antenna module is controlled to be switched to the second antenna, in which the second antenna is configured to radiate the fourth UWB pulse signal into the space;
  the antenna module is controlled to be switched to the third antenna and the fifth antenna, in which the third antenna and the fifth antenna are configured to receive the echo signals;
  the antenna module is controlled to be switched to the third antenna, in which the third antenna is configured to radiate the fifth UWB pulse signal into the space;
  the antenna module is controlled to be switched to the second antenna and the fourth antenna, in which the second antenna and the fourth antenna are configured to receive the echo signals;
  the antenna module is controlled to be switched to the third antenna, in which the third antenna is configured to radiate the sixth UWB pulse signal into the space; and
  the antenna module is controlled to be switched to the third antenna and the fifth antenna, in which the third antenna and the fifth antenna are configured to receive the echo signals.

In an example, the signal cycle is in positive correlation to time spent on generating the frame of detection data by the UWB chip.

It can be understood that the method provided by the example of the present disclosure corresponds to a working process of the mobile terminal in FIG. 1, and specific contents may refer to contents of all examples of the mobile terminal and will not be repeated in detail herein.

Figure 5:
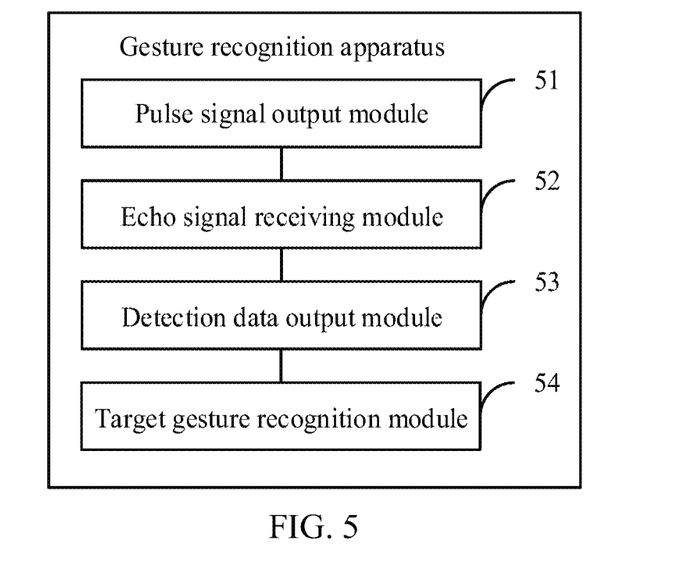
FIG. 5 is a block diagram of a gesture recognition apparatus illustrated according to an example.

On the basis of the gesture recognition method of the example shown in FIG. 4, an example of the present disclosure further includes a gesture recognition apparatus, referring to FIG. 5, including:
  a pulse signal output module 51, configured to output UWB pulse signals of a first preset quantity in a signal cycle;
  an echo signal receiving module 52, configured to control the antenna module to be switched to the target antenna, in which the target antenna includes a first target antenna configured to radiate the UWB pulse signals into the space and a second target antenna configured to receive echo signals, and the echo signals refer to signals returned after the UWB pulse signals meet a target object in the space;
  a detection data output module 53, configured to generate a frame of detection data on the basis of the echo signals of signal cycles of a second preset quantity; and
  a target gesture recognition module 54, configured to recognize a gesture of the target object on the basis of at least one frame of detection data.

It can be understood that the apparatus provided by the example of the present disclosure corresponds to the above method shown in FIG. 5, and specific contents may refer to contents of all examples of the method and will not be repeated in detail herein.

Figure 6:
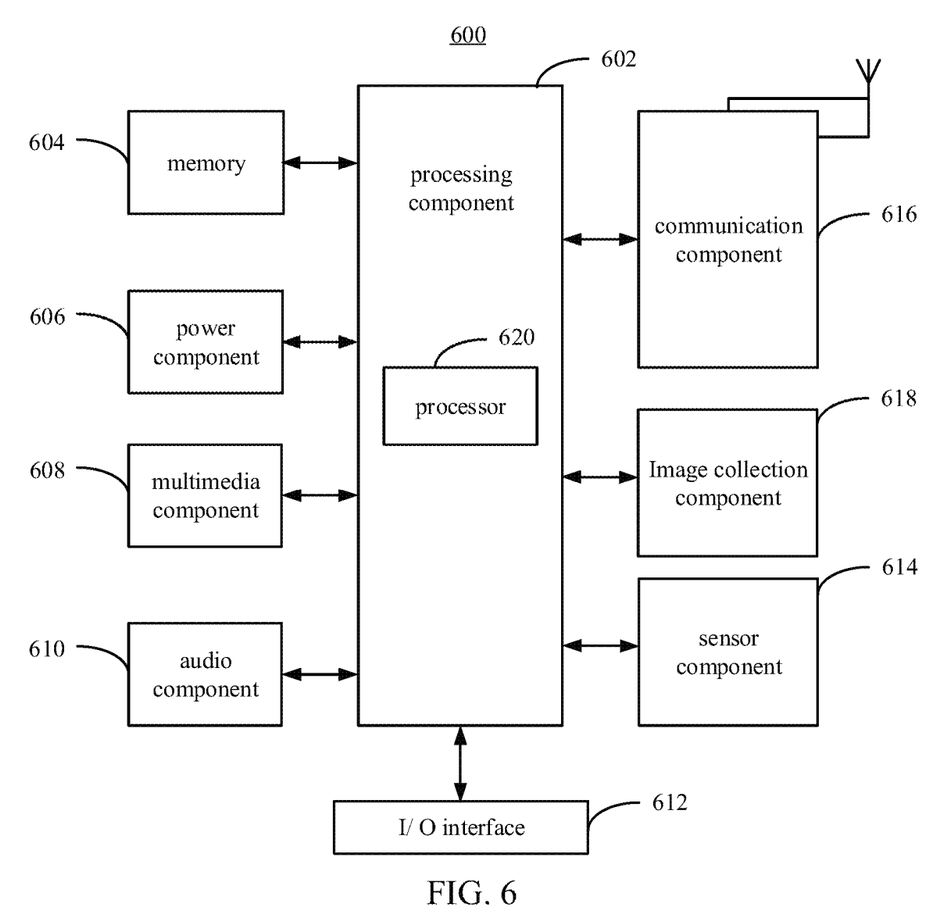
FIG. 6 is a block diagram of a mobile terminal illustrated according to an example.

FIG. 6 is a block diagram of a mobile terminal illustrated according to an example. For example, the mobile terminal 600 may be a smart phone, a computer, a digital broadcast terminal, a tablet device, a medical device, a fitness facility, a personal digital assistant, etc.

Referring to FIG. 6, the mobile terminal 600 may include one or more components as follows: a processing component 602, a memory 604, a power component 606, a multimedia component 608, an audio component 610, an input/output (I/O) interface 612, a sensor component 614, a communication component 616 and an image collection component 618.

The processing component 602 generally controls whole operation of the mobile terminal 600, such as operations related to display, phone call, data communication, camera operation and recording operation. The processing component 602 may include one or more processors 620 for executing a computer program. Besides, the processing component 602 may include one or more modules to facilitate interaction between the processing component 602 and the other components. For example, the processing component 602 may include a multimedia module so as to facilitate interaction between the multimedia component 608 and the processing component 602.

The memory 604 is configured to store various data so as to support operations on the mobile terminal 600. Instances of these data include a computer program of any application program or method for operation on the mobile terminal 600, contact person data, telephone directory data, messages, pictures, videos and the like. The memory 604 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 606 provides power for the various components of the mobile terminal 600. The power component 606 may include a power management system, one or more power sources, and other components related to power generation, management and distribution for the mobile terminal 600. The power component 606 may include a power chip, and a controller can communicate with the power chip so that the power chip can be controlled to turn on or turn off a switch device and then a battery can provide power or not provide power for a mainboard circuit.

The multimedia component 608 includes a screen which provides an output interface between the mobile terminal 600 and a target object. In some examples, a screen may include a liquid crystal display (LCD) and a touch panel (TP). If the screen includes the touch panel, the screen may be realized as a touch screen so as to receive an input signal from the target object. The touch panel includes one or more touch sensors so as to sense touching, swiping and gestures on the touch panel. The touch sensor can not only sense a boundary of a touching or swiping action, but also detect duration and pressure related to touching or swiping operation.

The audio component 610 is configured to output and/or input an audio signal. For example, the audio component 610 includes a microphone (MIC). When the mobile terminal 600 is in the operation mode, such as a call mode, a recording mode and a voice recognition mode, the microphone is configured to receive an external audio signal. The received audio signal may be further stored in the memory 604 or sent via the communication component 616. In some examples, the audio component 610 further includes a speaker for outputting the audio signal.

The I/O interface 612 provides an interface between the processing component 602 and a peripheral interface module, and the peripheral interface module may be a keyboard, a click wheel, buttons and the like.

The sensor component 614 includes one or more sensors, configured to provide state evaluation of various aspects for the mobile terminal 600. For example, the sensor component 614 may detect a start/shut-down state of the mobile terminal 600 and relative positioning of the components, for example, the components are a display and a keypad of the mobile terminal 600. The sensor component 614 may further detect position change of the mobile terminal 600 or one component of the mobile terminal 600, whether there is contact between the target object and the mobile terminal 600, and azimuth or speed up/speed down and temperature change of the mobile terminal 600. In the present instance, the sensor component 614 may include a magnetic sensor, a gyroscope and a magnetic field sensor. The magnetic field sensor includes at least one of: a Hall sensor, a thin film magneto-resistive sensor and a magnetic liquid acceleration sensor.

The communication component 616 is configured to facilitate wired or wireless communication between the mobile terminal 600 and the other devices. The mobile terminal 600 may be accessed to a wireless network based on a communication standard, such as WiFi, 2G, 3G, 4G, 5G or their combination. In an example, the communication component 616 receives a broadcast signal or related broadcast information from an external broadcast management system via a broadcast channel. In an example, the communication component 616 further includes a near-field communication (NFC) module so as to facilitate short-range communication. For example, the NFC module may be realized based on a radio frequency identification (RFID) technology, an infra-red data association (IrDA) technology, an ultra wide band (UWB) technology, a Bluetooth (BT) technology and other technologies.

In an example, the mobile terminal 600 may be realized by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements.

An example of the present disclosure further provides a mobile terminal, including:
 a processor; and
 a memory, configured to store a computer program executable by the processor.

The processor is configured to execute the computer program in the memory so as to realize any method described above.

An example of the present disclosure further provides a computer readable storage medium. When an executable computer program in the storage medium is executed by a processor, any method described above can be realized. The readable storage medium may be an ROM, a random access memory (RAM), a CD-ROM, a magnetic tape, a floppy disk, an optical data storage device, etc.

Those skilled in the art will easily devise other implementation solutions of the present disclosure after considering the specification and practicing the present disclosure disclosed herein. The present disclosure intends to cover any transformation, application or adaptive change which conforms to a general principle of the present disclosure and includes common general knowledge or conventional technical means which are not disclosed by the present disclosure in the technical field. The specification and the examples are only regarded as exemplary, the true scope and spirit of the present disclosure are indicated by the following claims.

It should be understood that the present disclosure is not limited to the structure described above and shown in the drawings and accepts various modifications and changes without departing from its scope. The scope of the present disclosure is limited only by the appended claims.

What is claimed is:

1. A mobile terminal, comprising
 an ultra wide band (UWB) chip, an antenna module that includes a plurality of antennas, wherein the plurality of antennas comprise a first antenna, a second antenna, a third antenna, a fourth antenna and a fifth antenna; the first antenna, the second antenna and the fourth antenna are arranged in a first direction in sequence; the second antenna, the fifth antenna and the third antenna are arranged in a second direction in sequence; the first direction is perpendicular to the second direction; and a distance between the first antenna and the second antenna is a wavelength, a distance between the second antenna and the fourth antenna is half of the wavelength, a distance between the second antenna and the fifth antenna is half of the wavelength, a distance between the third antenna and the fifth antenna is half of the wavelength, and a distance between the second antenna and the third antenna is a wavelength, a plurality of switches, wherein the plurality of switches are configured to control the antenna module to be switched to a target antenna, the target antenna comprises a time division multiplexing antenna, wherein the time division multiplexing antenna serves as a first target antenna at a moment in a signal cycle to radiate a UWB pulse signals into a space and serves as a second target antenna at another moment in the signal cycle to receive echo signals, and the echo signals refer to signals returned after the UWB pulse signals meet a target object in the space, and a processor, wherein the processor is configured to recognize a gesture of the target object based on a frame of detection data, wherein the UWB chip is connected with the plurality of switches and the processor respectively, the plurality of switches are connected with the antenna module; and wherein the UWB chip is configured to:
output a first preset number of UWB pulse signals in the signal cycle;
and
generate the frame of the detection data based on the echo signals in a second preset number of signal cycles.

2. The mobile terminal according to claim 1, wherein the plurality of switches are configured to control the antenna module to be switched to the target antenna, comprising:
sending a first switchover signal to the antenna module so as to switch the antenna module to the first target antenna, wherein the first target antenna is configured to radiate the UWB pulse signals into the space; and
sending a second switchover signal to the antenna module so as to switch the antenna module to the second target antenna, wherein the second target antenna is configured to receive the echo signals.

3. The mobile terminal according to claim 1, wherein the plurality of switches are configured to control the antenna module to be switched to a corresponding target antenna according to a time sequence of each of the UWB pulse signals.

4. The mobile terminal according to claim 3, wherein:
the first preset number is 6, and
the plurality of switches control the antenna module to be switched to the corresponding target antenna according to the time sequence of each of the UWB pulse signals by:
controlling the antenna module to be switched to the first antenna, wherein the first antenna is configured to radiate the first UWB pulse signal into the space;
controlling the antenna module to be switched to the second antenna and the fourth antenna, wherein the second antenna and the fourth antenna are configured to receive the echo signals;
controlling the antenna module to be switched to the first antenna, wherein the first antenna is configured to radiate a second UWB pulse signal into the space;
controlling the antenna module to be switched to the third antenna and the fifth antenna, wherein the third antenna and the fifth antenna are configured to receive the echo signals;
controlling the antenna module to be switched to the second antenna, wherein the second antenna is configured to radiate a third UWB pulse signal into the space;
controlling the antenna module to be switched to the second antenna and the fourth antenna, wherein the second antenna and the fourth antenna are configured to receive the echo signals;
controlling the antenna module to be switched to the second antenna, wherein the second antenna is configured to radiate a fourth UWB pulse signal into the space;
controlling the antenna module to be switched to the third antenna and the fifth antenna, wherein the third antenna and the fifth antenna are configured to receive the echo signals;
controlling the antenna module to be switched to the third antenna, wherein the third antenna is configured to radiate a fifth UWB pulse signal into the space;
controlling the antenna module to be switched to the second antenna and the fourth antenna, wherein the second antenna and the fourth antenna are configured to receive the echo signals;
controlling the antenna module to be switched to the third antenna, wherein the third antenna is configured to radiate a sixth UWB pulse signal into the space; and
controlling the antenna module to be switched to the third antenna and the fifth antenna, wherein the third antenna and the fifth antenna are configured to receive the echo signals.

5. The mobile terminal according to claim 1, wherein the first target antenna is one of the first antenna, the second antenna or the third antenna, and the second target antenna is a group of the second antenna and the fourth antenna or a group of the third antenna and the fifth antenna.

6. The mobile terminal according to claim 1, further comprising a filter module, wherein the filter module is connected with the UWB chip and the plurality of switches respectively and configured to filter out noise signals in the echo signals.

7. The mobile terminal according to claim 1, wherein the plurality of switches comprise a first switchover switch, a second switchover switch and a third switchover switch, and control ends of the first switchover switch, the second switchover switch and the third switchover switch are configured to receive a first switchover control signal and a second switchover control signal;
a first end of the first switchover switch is connected with the UWB chip, a second end of the first switchover switch is connected with the first antenna, and a third end of the first switchover switch is connected with a first end of the second switchover switch;
a second end of the second switchover switch is connected with the UWB chip, a third end of the second switchover switch is connected with the second antenna, and a fourth end of the second switchover switch is connected with the third antenna; and a first end of the third switchover switch is connected with the UWB chip, a second end of the third switchover switch is connected with the fourth antenna, and a third end of the third switchover switch is connected with the fifth antenna.

8. The mobile terminal according to claim 7, wherein both the first switchover switch and the third switchover switch are single-pole double-throw switches, and the second switchover switch is a double-pole double-throw switch.

9. A gesture recognition method method-comprising:

outputting, by a mobile terminal, a first preset number of ultra wide band (UWB) pulse signals in a signal cycle;

selecting, by the mobile terminal, a target antenna from among a plurality of antennas, wherein the plurality of antennas comprises a first antenna, a second antenna, a third antenna, a fourth antenna and a fifth antenna; the first antenna, the second antenna and the fourth antenna are arranged in a first direction in sequence; the second antenna, the fifth antenna and the third antenna are arranged in a second direction in sequence; the first direction is perpendicular to the second direction; and a distance between the first antenna and the second antenna is a wavelength, a distance between the second antenna and the fourth antenna is half of the wavelength, a distance between the second antenna and the fifth antenna is half of the wavelength, a distance between the third antenna and the fifth antenna is half of the wavelength, and a distance between the second antenna and the third antenna is a wavelength;

controlling, by the mobile terminal, an antenna module to be switched to the target antenna, wherein the target antenna comprises a time division multiplexing antenna, wherein the time division multiplexing antenna serves as a first target antenna at a moment in the signal cycle to radiate the UWB pulse signals into a space and serves as a second target antenna at another moment in the signal cycle to receive echo signals, and the echo signals refer to signals returned after the UWB pulse signals meet a target object in the space;

generating, by the mobile terminal, a frame of detection data based on the echo signals in a second preset number of signal cycles; and recognizing, by the mobile terminal, a gesture based on the frame of the detection data.

10. The method according to claim 9, wherein controlling the antenna module to be switched to the target antenna comprises:

sending, by the mobile terminal, a first switchover signal to the antenna module so as to switch the antenna module to the first target antenna, wherein the first target antenna is configured to radiate the UWB pulse signals into the space; and sending, by the mobile terminal, a second switchover signal to the antenna module so as to switch the antenna module to the second target antenna, wherein the second target antenna is configured to receive the echo signals.

11. The method according to claim 10, wherein the first target antenna is one of the first antenna, the second antenna or the third antenna, and the second target antenna is a group of the second antenna and the fourth antenna or a group of the third antenna and the fifth antenna.

12. The method according to claim 11, wherein the first preset number is 6, and controlling the antenna module to be switched to the target antenna comprises:

controlling, by the mobile terminal, the antenna module to be switched to the first antenna, wherein the first antenna is configured to radiate the first UWB pulse signal into the space;

controlling, by the mobile terminal, the antenna module to be switched to the second antenna and the fourth antenna, wherein the second antenna and the fourth antenna are configured to receive the echo signals;

controlling, by the mobile terminal, the antenna module to be switched to the first antenna, wherein the first antenna is configured to radiate a second UWB pulse signal into the space;

controlling, by the mobile terminal, the antenna module to be switched to the third antenna and the fifth antenna, wherein the third antenna and the fifth antenna are configured to receive the echo signals;

controlling, by the mobile terminal, the antenna module to be switched to the second antenna, wherein the second antenna is configured to radiate a third UWB pulse signal into the space;

controlling, by the mobile terminal, the antenna module to be switched to the second antenna and the fourth antenna, wherein the second antenna and the fourth antenna are configured to receive the echo signals;

controlling, by the mobile terminal, the antenna module to be switched to the second antenna, wherein the second antenna is configured to radiate a fourth UWB pulse signal into the space;

controlling, by the mobile terminal, the antenna module to be switched to the third antenna and the fifth antenna, wherein the third antenna and the fifth antenna are configured to receive the echo signals;

controlling, by the mobile terminal, the antenna module to be switched to the third antenna, wherein the third antenna is configured to radiate a fifth UWB pulse signal into the space;

controlling, by the mobile terminal, the antenna module to be switched to the second antenna and the fourth antenna, wherein the second antenna and the fourth antenna are configured to receive the echo signals;

controlling, by the mobile terminal, the antenna module to be switched to the third antenna, wherein the third antenna is configured to transmit a sixth UWB pulse signal into the space; and controlling, by the mobile terminal, the antenna module to be switched to the third antenna and the fifth antenna, wherein the third antenna and the fifth antenna are configured to receive the echo signals.

13. The method according to claim 9, wherein the signal cycle is in positive correlation to time spent on generating the frame of the detection data by a UWB chip.

14. A non-transitory computer readable storage medium storing instructions executed by a processor of the mobile terminal cause the mobile terminal to execute the method according to claim 9.

15. A mobile terminal, comprising:

a processor;

an antenna module that includes a plurality of antennas, and the plurality of antennas comprises a first antenna, a second antenna, a third antenna, a fourth antenna and a fifth antenna; the first antenna, the second antenna and the fourth antenna are arranged in a first direction in sequence; the second antenna, the fifth antenna and the third antenna are arranged in a second direction in sequence; the first direction is perpendicular to the second direction; and a distance between the first antenna and the second antenna is a wavelength, a distance between the second antenna and the fourth antenna is half of the wavelength, a distance between the second antenna and the fifth antenna is half of the wavelength, a distance between the third antenna and the fifth antenna is half of the wavelength, and a distance between the second antenna and the third antenna is a wavelength; and a memory, configured to store a computer program that is executable by the processor, wherein the processor is configured to execute the computer program, wherein the computer program when executed by the processor causes the mobile terminal to:

output a first preset number of UWB pulse signals in a signal cycle;

control the antenna module to be switched to a target antenna, wherein the target antenna comprises a time division multiplexing antenna, wherein the time division multiplexing antenna serves as a first target antenna at a moment in the signal cycle to radiate the UWB pulse signals into a space and serves as a second target antenna at another moment in the signal cycle to receive echo signals, and the echo signals refer to signals returned after the UWB pulse signals meet a target object in the space;

generate a frame of detection data based on the echo signals in a second preset number of signal cycles; and recognize a gesture based on the frame of the detection data.

16. The mobile terminal according to claim 15, wherein the computer program when executed by the processor further causes the mobile terminal to:

send a first switchover signal to the antenna module so as to switch the antenna module to the first target antenna, wherein the first target antenna is configured to radiate the UWB pulse signals into the space; and send a second switchover signal to the antenna module so as to switch the antenna module to the second target antenna, wherein the second target antenna is configured to receive the echo signals.

17. The mobile terminal according to claim 15, wherein the first target antenna is one of the first antenna, the second antenna or the third antenna, the second target antenna is a group of the second antenna and the fourth antenna or a group of the third antenna and the fifth antenna, and moreover, the first preset number is 6;

the computer program when executed by the processor further cause the mobile terminal to:

control the antenna module to be switched to the first antenna, wherein the first antenna is configured to radiate the first UWB pulse signal into the space;

control the antenna module to be switched to the second antenna and the fourth antenna, wherein the second antenna and the fourth antenna are configured to receive the echo signals;

control the antenna module to be switched to the first antenna, wherein the first antenna is configured to radiate a second UWB pulse signal into the space;

control the antenna module to be switched to the third antenna and the fifth antenna, wherein the third antenna and the fifth antenna are configured to receive the echo signals;

control the antenna module to be switched to the second antenna, wherein the second antenna is configured to radiate a third UWB pulse signal into the space;

control the antenna module to be switched to the second antenna and the fourth antenna, wherein the second antenna and the fourth antenna are configured to receive the echo signals;

control the antenna module to be switched to the second antenna, wherein the second antenna is configured to radiate a fourth UWB pulse signal into the space;

control the antenna module to be switched to the third antenna and the fifth antenna, wherein the third antenna and the fifth antenna are configured to receive the echo signals;

control the antenna module to be switched to the third antenna, wherein the third antenna is configured to radiate a fifth UWB pulse signal into the space;

control the antenna module to be switched to the second antenna and the fourth antenna, wherein the second antenna and the fourth antenna are configured to receive the echo signals;

control the antenna module to be switched to the third antenna, wherein the third antenna is configured to transmit a sixth UWB pulse signal into the space; and control the antenna module to be switched to the third antenna and the fifth antenna, wherein the third antenna and the fifth antenna are configured to receive the echo signals.

* * * * *

UNITED STATES PATENT AND TRADEMARK OFFICE
CERTIFICATE OF CORRECTION

PATENT NO. : 12,292,497 B2  
APPLICATION NO. : 17/585908  
DATED : May 6, 2025  
INVENTOR(S) : Wendou Fang Page 1 of 1

It is certified that error appears in the above-identified patent and that said Letters Patent is hereby corrected as shown below:

In the Claims

In Column 17, Line 13, in Claim 9, delete "method method" and insert -- method, the method --, therefor.

In Column 17, Line 13, in Claim 9, delete "-comprising:" and insert -- comprising: --, therefor.

Signed and Sealed this
First Day of July, 2025

Coke Morgan Stewart
*Acting Director of the United States Patent and Trademark Office*